United States Patent [19]

Dien

[11] 3,954,392
[45] May 4, 1976

[54] COPPER PHTHALOCYANINE N-DI-N-BUTYLAMINOALKYL SULFONAMIDE, QUATERNIZED SOLUTIONS OF THE QUATERNARY COMPOUND, AND PAPER DYEING THEREWITH

[75] Inventor: Chi K. Dien, Buffalo, N.Y.

[73] Assignee: Allied Chemical Corporation, New York, N.Y.

[22] Filed: Aug. 2, 1973

[21] Appl. No.: 385,016

[52] U.S. Cl. .................................. 8/7; 8/1 XA; 162/162; 260/314.5
[51] Int. Cl. ........................ D21h 1/46; C09b 47/04
[58] Field of Search .................. 8/7, 1 XA, 1 S, 54, 8/54.2, 178 R, 177 AB, 314.5; 162/162

[56] References Cited
UNITED STATES PATENTS

| | | | |
|---|---|---|---|
| 2,863,875 | 12/1958 | Bienert et al. | 260/314.5 |
| 3,210,345 | 10/1965 | Gamlen et al. | 8/178 R |
| 3,454,568 | 7/1969 | Fuchs et al. | 260/314.5 |
| 3,565,570 | 2/1971 | Dien | 8/7 |

Primary Examiner—Donald Levy
Attorney, Agent, or Firm—Anthony J. Stewart; Jay P. Friedenson

[57] ABSTRACT

A new dye having a turquoise blue color and high water solubility suitable for dyeing cellulose materials such as paper and textile fibers such as cotton, polyamides and polyacrylonitrile having the formula:

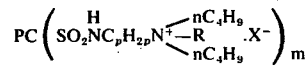

wherein $p$ is 2 or 3, $m$ is 1 through 5, PC is a phthalocyanine radical, $X^-$ is an anion and R is H or lower alkyl of 1 through 4 carbon atoms.

The invention further comprises a process for using the new dye on paper, the paper dyed with the new dye and the base intermediate used for preparing the new dye.

9 Claims, No Drawings

COPPER PHTHALOCYANINE N-DI-N-BUTYLAMINOALKYL SULFONAMIDE, QUATERNIZED SOLUTIONS OF THE QUATERNARY COMPOUND, AND PAPER DYEING THEREWITH

This invention relates to a new dye having a turquoise blue color and high water solubility suitable for dyeing cellulose materials such as paper and textile fibers such as cotton, polyamides, and polyacrylonitrile. The invention further relates to the process for using the new dye on paper and to the paper dyed with the new dye.

Numerous water soluble turquoise dyes are known in the prior art which are suitable for dyeing paper; however, the known dyes have poor bleed properties or their known method of manufacture results in carcenogenic byproducts.

A few specific prior art dyes suited for dyeing paper are disclosed in U.S. Pat. No. 2,863,875 which have a turquoise (greenish-blue) color but unfortunately all of which have poor bleed properties, in that after paper is dyed with the compounds specifically disclosed in U.S. Pat. No. 2,863,875 the bluish-green color will transfer to other surfaces when the dyed paper becomes wet with water or any aqueous based liquid. U.S. Pat. 2,863,875 generically, though not specifically, discloses billions of compounds which are alleged to be dyes. There is however unfortunately no suggestion of which of the billions of compounds generically disclosed have a turquoise color when applied from an aqueous solution and at the same time have good bleed characteristics.

In accordance with this invention a few specific turquoise dyes have now been discovered which have good strength and superior bleed properties when applied to substrates, particularly paper.

The base for the dyes which have now been discovered is represented by the formula:

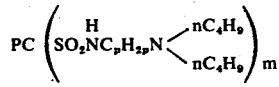

Copper Phthalocyanine N-Di-n-Butylaminoalkyl Sulfonamide

PC may be any suitable phthalocyanine radical such as metal free phthalocyanine, copper phthalocyanine, cobalt phthalocyanine, nickel phthalocyanine, zinc phthalocyanine and iron phthalocyanine. The phthalocyanine radical may also be poly-halogenated (e.g. tetrachloro-copper phthalocyanine). The preferred phthalocyanine radical is copper phthalocyanine (CPC).

Any number from 1 through 5- groups of the formula:

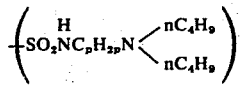

wherein $p$ is 2 or 3 can be attached to the phthalocyanine radical without detrimental effect. The number of groups attached to the phthalocyanine radical is represented by the letter $m$. The above base for the new dyes may be quaternized to the water soluble dyes of the invention with any suitable quaternizing agent such as a lower alkyl sulfate or halide containing up to 4 carbon atoms such as methyl or ethyl sulfate or halide or may be converted to a salt with an acid to form water soluble acid salts of the formula:

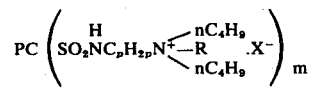

wherein $p$ is 2 or 3, $n$ is 1 through 5, PC is a phthalocyanine radical, $X^-$ is an anion and R is H or lower alkyl of 1 through 4 carbon atoms. R is preferably H and $X^-$ is any suitable anion such as sulfate, acetate or halide.

The dyes of this invention may be dissolved in water in concentrations up to about 60 percent by weight so that they may be readily and easily dispersed in liquid form into paper pulp. A concentration of from about 20 to about 60 weight percent is preferred.

In dyeing paper, an aqueous solution of the new dye compound is contacted with the paper either by blending the dye in powder or solution form with a slurry of the paper pulp or by contacting formed paper sheet with aqueous dye solution. Preferably the dye is blended with the paper pulp. The preferred concentration of the new dye in the paper for satisfactory color is from about 0.25 to about 1.0 percent based upon the dry weight of the paper.

The preferred compounds of the invention are those compound wherein the number m of

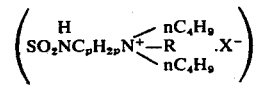

groups is 2 through 4.

In accordance with one method for preparing the compounds of the invention copper phthalocyanine is chlorosulfonated by dissolving the copper phthalocyanine in chlorosulfonic acid. Preferably from about 10 to about 20 weight percent chlorosulfonic acid based upon the weight of copper phthalocyanine is used. The solution is then heated until the desired amount of chlorosulfonation is obtained. The heating temperature is preferably between 100°–150°C. and the preferred amount of chlorosulfonation is from 2 to 4 chlorosulfonic acid groups per copper phthalocyanine radical. Thionyl chloride or phosphorus chloride may be added to convert any sulfonic acid radicals, which may result from the reaction, to sulfonyl chloride radicals.

The reaction mixture is then cooled and poured onto ice. A precipitate is formed, filtered off and washed with ice water until substantially free from acid.

The wet copper phthalocyanine sulfonyl chloride precipitate is then reslurried into ice water and condensed with excess amine of the formula

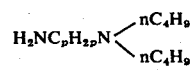

until the formation of the base for the dye of the invention is completed. The reaction temperature is preferably between about 25° and 60°C. Sodium hydroxide may then be added to precipitate the basic copper phthalocyanine sulfonyl amine dyestuff which is then filtered and washed with water. The dyestuff may then be converted to a water soluble salt by acidifying with strong mineral or organic acid or quaternizing with a quaternizing agent having 1 through 4 carbon atoms.

Alternatively the color may be converted to a water soluble salt without isolation of the dyestuff by acidification of the condensation mixture. The dyestuff can then be isolated by salting out with an inorganic salt such as sodium chloride.

The compounds of the invention are particularly superior dyes for paper in that they have superior solubility in aqueous solutions e.g. up to about 60 weight percent in organic acid solution. The dye may be mixed with other compounds. For example when used as a powder, dry organic acid may be added for convenience as a dry diluent to permit a low pH upon formation of an aqueous solution. Aqueous solutions containing from about 20 to 60 weight percent of a compound of the invention are particularly suitable for conventional addition to paper pulp slurries. The compounds of the invention have good resistance to bleeding from the paper after the paper is dyed. In addition the dyestuff of the invention has good color strength when compared with prior art dyes having poor bleed properties. When the comparative strengths are based upon the weight of the relatively expensive phthalocyanine chromophor the color strengths are about the same. The only water soluble prior art dyes for cellulose materials such as paper having bleed characteristics as good as the dye of the present invention coupled with good dye strength are dyes prepared from the intermediate CPC—(CH$_2$Cl)$_n$, the only known preparation of which results in the formation of carcenogenic by-products.

The following examples showing preparation of the dyes of the invention and a comparison of the dyes of the invention with other prior art dyes or dyes having structural similarities will further illustrate the superiority of the dyes of the invention. In the following examples all parts and percentages are by weight unless otherwise indicated.

EXAMPLE 1

300 ml of chloro sulfonic acid is charged into a 500 ml three-necked flask. 60 g of concentrated copper phthalocyanine is then added over a period of 30 minutes at 20°–60°C. The mixture is then heated to 140°–145°C. for 5 hours and the reaction mixture is cooled to 40°C. 30 ml of thionyl chloride are then added in 10 ml increments. The mixture is agitated for 30 minutes after the first 2 additions and heated to 120°C. over a period of 1 hour after the third addition. The mixture is then cooled to 30°C. and added to 2000 ml of ice water. Additional ice is added to keep the mixture between 0° and 5°C. The mixture is filtered and washed with ice water until the resulting precipitate is free from acid. The precipitate is then reslurried into 1200 ml of water at a temperature of 0°–5°C. The resulting slurry contains copper phthalocyanine sulfonyl chloride which is substantially free from impurities other than water.

EXAMPLE 2

200 ml of copper phthalocyanine sulfonyl chloride CPC—(SO$_2$Cl)$_{3-4}$ slurry prepared in Example 1 are introduced into a 500 ml flask and 15 g of 1-amino-3-dibutylaminopropane,

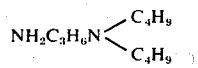

are then added and the temperature is allowed to rise to room temperature and the mixture is then agitated for 16 hours. The pH is then adjusted to 9 to 9.5 by adding 10 percent NaOH. The mixture is then agitated for 1 hour. 10 percent H$_2$SO$_4$ is then added until the pH of 1.5–2 is obtained and the mixture is heated to 60°C. until substantially all of the components are in solution. 25 g of Na$_2$SO$_4$ are then added and the mixture is agitated and cooled to 25°C. The mixture is then filtered to obtain

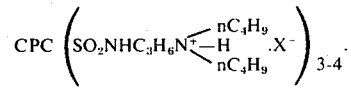

EXAMPLE 3

200 ml of the slurry obtained in Example 1 are added to a 500 ml flask. 15 g of

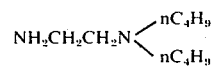

are then added with agitation. The temperature is then permitted to rise to room temperature. The mixture is then agitated over night and the pH is adjusted and the dye is converted with the H$_2$SO$_4$ as in Example 2. The resulting dye

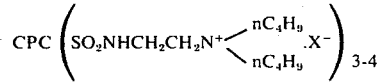

has good water solubility, good bleed properties and good color strength.

EXAMPLE 4

1.2 g of each of the dyes prepared in Examples 2 and 3 are dissolved in separate 500 cc quantities of distilled water. Ten cc's each of the dye solutions are added to separate 343 ml quantities of a slurry of a paper pulp containing 50 weight percent bleached hardwood kraft and 50 weight percent bleached sulfite kraft having a 300 ml/min. Canadian Standard Freeness. The slurry has an O.D. stock consistency of 1.40 percent. The dye and pulp slurries are then thoroughly agitated and the slurries are drawn down into 7½ × 7½ inch squares of paper one of which is dyed by the dye prepared in Example 2 and one of which is dyed by the dye prepared in Example 3.

Both squares of paper have a clear turquoise blue color and have superior resistance to bleed.

EXAMPLE 5

Dyes prepared in Examples 2 and 3 are compared with prior art dyes and other copper phthalocyanine dyes to determined comparative strengths and bleed properties. The results are set forth in Table 1.

The dyed paper samples used in the test are prepared in accordance with the procedure of Example 4.

The paper dyeing strength is determined by visual comparison by a skilled colorist of paper dyed by aqueous solutions of dyes at the same concentrations, time periods and temperature.

The bleed properties are determined by stapling samples of the dyed paper to be tested on the inside of folded filter paper. The prepared sample is then immersed into the test liquid, water or milk. The paper is then removed and excess solution is removed by hand pressing between blotters. The samples are then folded away from the filter paper and air dried. The amount of bleed onto the filter paper is then visually observed. As used in Table 1, nil means substantially no bleed is observed, slight means that bleed is perceptible, appreciable means that bleed is easily visible and considerable means that bleed is very easily visible with substantial dye transfer.

Table 1 clearly indicates the criticality of the structure of the dyes of the present invention as distinguished from the teachings of U.S. Pat. No. 2,863,875 which discloses no criticality of structure. It is believed that the results in Table 1 indicate that alkyl groups at the terminal amine position of the compounds of the invention must be no larger than n-butyl and must not be branched alkyl groups to obtain sufficient water solubility. In addition the results in Table 1 indicate that the alkyl groups at the terminal amine position must be no smaller than n-butyl or poor bleed characteristics are obtained.

Although U.S. Pat. No. 2,863,875 discloses a multitude of compounds to be used as turquoise dyes it has been unexpectedly discovered that only the compounds of the present invention having n-butyl groups at the terminal amine position have both high water solubility and good bleed properties.

It has also been unexpectedly found as indicated by Table 1 that the alkyl group between the two nitrogens in the compound can be no larger than propyl if sufficient water solubility is to be obtained.

wherein $p$ is 2 or 3, $m$ is 1 through 5, PC is a phthalocyanine radical, $X^-$ is an anion and R is H or lower alkyl of 1 through 4 carbon atoms.

2. A compound in accordance with claim 1 wherein $m$ is 2 through 4, PC is a copper phthalocyanine radical, $p$ is 3 and $X^-$ is an anion selected from acetate, sulfate and halide and R is H.

3. A compound in accordance with claim 1 wherein $m$ is 2 through 4, PC is a copper phthalocyanine radical, $p$ is 2, R is H and $X^-$ is an anion selected from acetate, sulfate and halide.

4. A process for dyeing paper comprising contacting the paper with an aqueous solution of a compound of the formula:

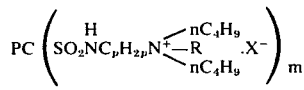

wherein $p$ is 2 or 3, $m$ is 1 through 5, PC is a phthalocyanine radical, $X^-$ is an anion and R is H or lower alkyl of 1 through 4 carbon atoms.

5. The process according to claim 4 wherein R is H and PC is a copper phthalocyanine radical.

6. A composition comprising an aqueous solution of from about 20 to about 60 weight percent of a compound of the formula:

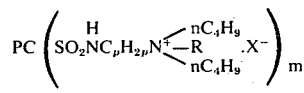

wherein $p$ is 2 or 3, $m$ is 1 through 5, PC is a phthalocy-

TABLE 1

| Dye CPC $(SO_2R_a)_{2-4}$ $R_a=$ | EXPERIMENTAL Yield: g. color 100 g. CPC | Solubility In Water | Paper Dyeing Strength vs. Standard Based Upon Total Weight Of Dye Composition | Paper Dyeing Strength Based Upon the Weight Of Copper Phthalocyanine Chromophor | Bleed Water Hot Dried | Milk |
|---|---|---|---|---|---|---|
| 1. NH.C$_3$H$_6$.N$^+$—H  X$^-$ with CH$_3$/CH$_3$ | 171 g. | good solubility | std. | std. | appreciable | considerable |
| 2. NH.C$_3$H$_6$.N$^+$—H  X$^-$ with C$_2$H$_5$/C$_2$H$_5$ | 140 g. | good solubility | 85% | 70% | considerable | considerable |
| 3. NH.C$_3$H$_6$.N$^+$—H  X$^-$ with C$_3$H$_7$(n)/C$_3$H$_7$(n) | 167 g. | good solubility | 75% | 73% | appreciable | considerable |
| 4. NH.C$_3$H$_6$.N$^+$—H  X$^-$ with C$_3$H$_7$(iso)/C$_3$H$_7$(iso) | 204 g. | poor solubility | 23% | 27% | considerable | slight |
| 5. NH.C$_3$H$_6$.N$^+$—H  X$^-$ with C$_4$H$_9$(n)/C$_4$H$_9$(n) | 228 g. | good solubility | 68% | 91% | nil | nil |
| 6. NH.C$_3$H$_6$.N$^+$—H  X$^-$ with C$_4$H$_9$(iso)/C$_4$H$_9$(iso) | 216 g. | poor solubility | no color value | — | — | — |
| 7. NH.C$_3$H$_6$.N$^+$—H  X$^-$ with C$_5$H$_{11}$(n)/C$_5$H$_{11}$(n) | 233 g. | poor solubility | no color value | — | — | — |
| 8. NH.C$_2$H$_4$.N$^+$—H  X$^-$ with C$_4$H$_9$(n)/C$_4$H$_9$(n) | 218 g. | good solubility | 65% | 83% | nil | nil |
| 9. NH.C$_4$H$_8$.N$^+$—H  X$^-$ with C$_4$H$_9$(n)/C$_4$H$_9$(n) | 243 g. | poor solubility | no color value | — | — | — |
| 10. NH.C$_4$H$_8$.N$^+$—H  X$^-$ with C$_2$H$_5$/C$_2$H$_5$ | 178 g. | poor solubility | 27% | 28% | considerable | appreciable |
| 11. NH.C$_3$H$_6$.N$^+$—H  X$^-$ with C$_2$H$_4$OH/C$_2$H$_4$OH | 204 g. | poor solubility | no color value | — | — | — |

I claim:
1. A compound of the formula:

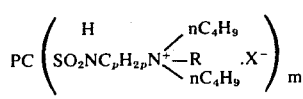

anine radical, $X^-$ is an anion and R is H or lower alkyl of 1 through 4 carbon atoms.

7. The composition of claim 6 wherein R is H and PC is a copper phthalocyanine radical.

8. A composition comprising paper dyed with a compound of the formula:

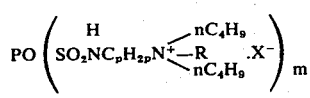
wherein $p$ is 2 or 3, $m$ is 1 through 5, PC is a phthalocyanine radical, $X^-$ is an anion and R is H or lower alkyl of 1 through 4 carbon atoms.
9. The paper in accordance with claim 8 wherein R is H and PC is a copper phthalocyanine radical.
* * * * *